Aug. 14, 1934.  C. E. BOWMAN  1,970,487
BREAD BAND
Filed Feb. 9, 1933  2 Sheets-Sheet 1

C. E. Bowman  Inventor

By C. A. Snow & Co.
Attorneys.

Aug. 14, 1934.   C. E. BOWMAN   1,970,487
BREAD BAND
Filed Feb. 9, 1933   2 Sheets-Sheet 2
Fig. 5.
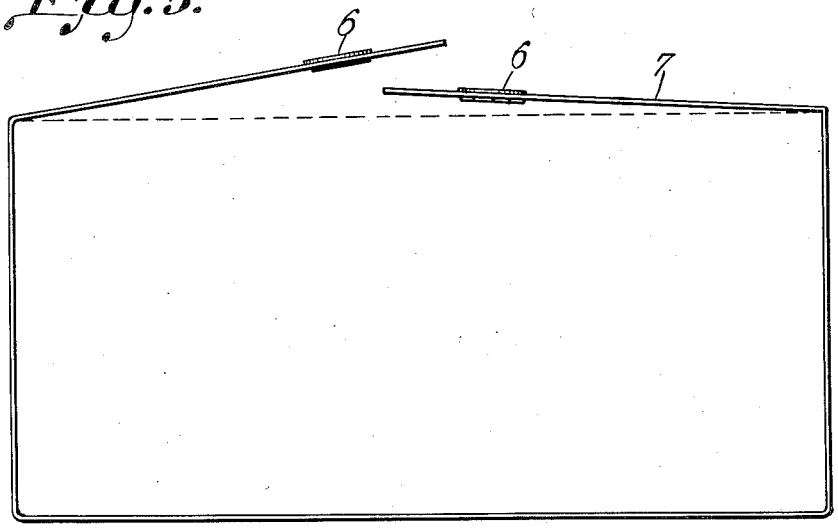
Fig. 6.   Fig. 7.   Fig. 8.   Fig. 9.
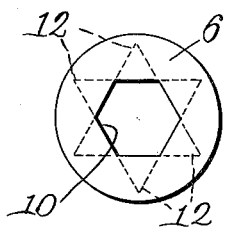 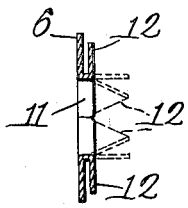 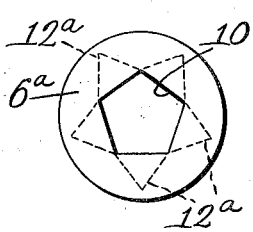 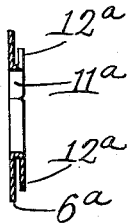
Fig. 10.   Fig. 11.   Fig. 12.   Fig. 13.
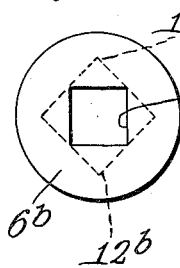 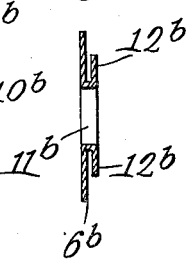 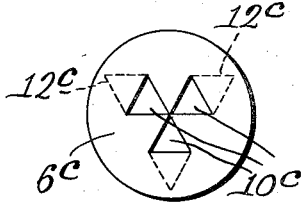 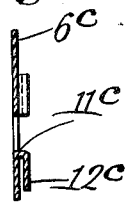
C. E. Bowman   Inventor
By C. A. Snow & Co.
Attorneys.

Patented Aug. 14, 1934

1,970,487

UNITED STATES PATENT OFFICE 1,970,487

BREAD BAND

Charles E. Bowman, Clinton, Iowa

Application February 9, 1933, Serial No. 656,043

3 Claims. (Cl. 24—18)

The device forming the subject matter of this application is a band, for the purpose of holding together a loaf of sliced bread, or slices of bread. As loaves of sliced bread come from the slicer, the slices naturally tend to fall apart, thus making it difficult to wrap or market the bread.

Although the device forming the subject matter of this application may be used to hold together articles other than pieces of bread, the present invention aims to provide a structure whereby sliced bread, primarily, may be held together, as hereinbefore explained. The invention aims to provide novel means for connecting together the ends of the band. Another object of the invention is to provide a bread band which can be operated from a machine.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it bein understood that changes in the precise embodiment of the invention herein disclosed, may be made within the scope of what is claimed, without departing from the spirit of the invention.

In the accompanying drawings:

Fig. 5 is an elevation showing the article assembled with an object other than a loaf of bread, the ends of the band being separated;

Fig. 6 is a plan of the button used in the form depicted in Fig. 1;

Fig. 7 is a cross section of the structure shown in Fig. 6;

Fig. 8 is a plan showing a modified button;

Fig. 9 is a cross section of the button of Fig. 8;

Fig. 10 is a plan showing a further modification in the button;

Fig. 11 is a cross section of the structure shown in Fig. 10;

Fig. 12 is an elevation or plan showing a still further modification in the button;

Fig. 13 is a section of the structure shown in Fig. 12.

Figure 1:
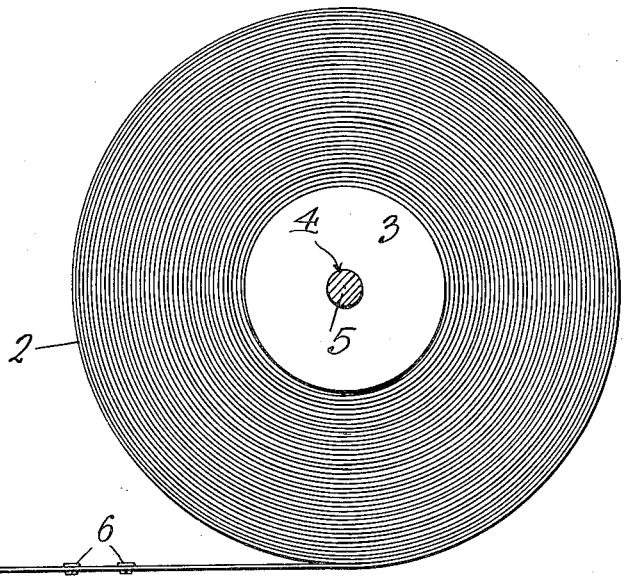
Fig. 1 shows in elevation, a device constructed in accordance with the invention, in the form of a roll.
Figure 2:
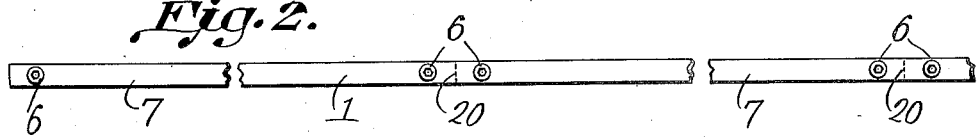
Fig. 2 is a plan of the article in the form of a strip, as it comes from the roll shown in Fig. 1.
Figure 3:
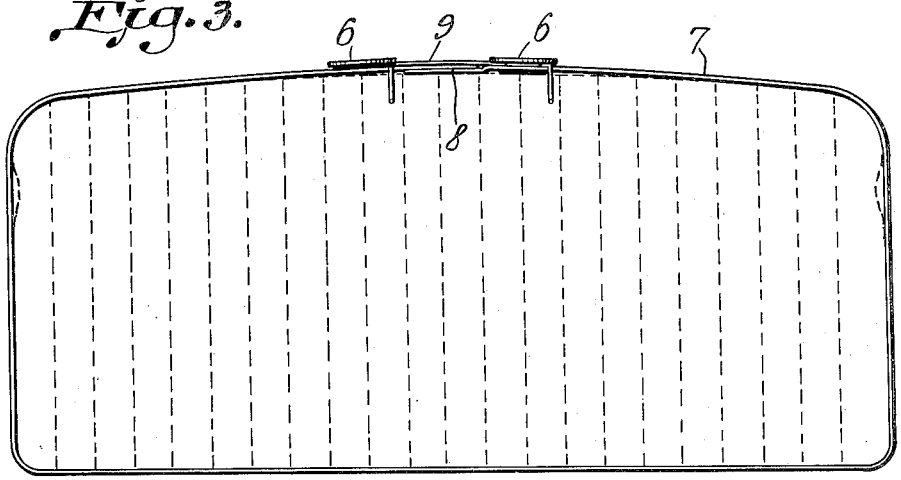
Fig. 3 is a transverse section showing the band mounted on a loaf of bread.

In carrying out the invention, there is provided a tape 1, of any desired length, made of paper or any other flexible material. The tape 1 is formed into a roll 2, about a core 3, the core 3 having an opening 4 adapted to receive a shaft 5 of the machine which carries the roll 2.

On the tape 1 are placed a plurality of pairs of buttons 6. The tape 1 is severed, as shown at 20, between the buttons of each pair, to form bands 7, each band having a button near to each of its ends.

Figure 4:
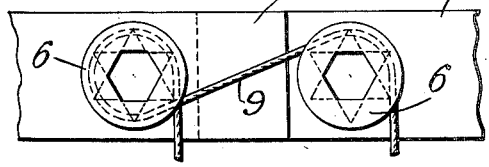
Fig. 4 is a plan showing the overlapped ends of the band.

The band 7 is placed about a loaf of bread, or other object, the ends of the band 7 are overlapped on each other, as shown at 8 in Fig. 4, and a cord or other flexible securing element 9 is engaged detachably with the buttons, the band thus being hald securely about the loaf of sliced bread, or the like.

The buttons may be formed in a wide variety of ways. Thus, as shown in Figs. 6 and 7, the button 6 is in the form of a flat, circular plate, made of metal, fibre or any other suitable substance, the button having a hexagonal hole 10. The material freed in the making of the hole 10 is bent to form a neck 11, extended through the tape 1, the neck carrying prongs 12, which are bendable, so that they may be engaged with the inner surface of the tape, to hold the button securely in place.

In Fig. 8, parts hereinbefore described have been designated by numerals previously used, with the suffix "a". In Figs. 8 and 9, the hole 10a is pentagonal, and there is a corresponding decrease in the number of prongs.

In Figs. 10 and 11, the parts hereinbefore described have been designated by numerals previously used, with the suffix "b". The hole 10b is square, and there are four prongs.

In Figs. 12 and 13, there are three of the holes 10c, parts hereinbefore described being designated, in Figs. 12 and 13, by numerals previously used, with the suffix "c". The holes 10c are triangular, and have their apices disposed at the geometrical center of the button 6c. The material on the outer edges of the holes 10c is formed into the neck 11c and into the prongs 12c, as hereinbefore described.

In general, the button may be made in many different ways, without departing from the spirit of the invention.

The device forming the subject matter of this application will be found to be of use, because, in the baking industry, at the present time, there is need of some simple and efficient means for holding sliced bread and the like together whilst the bread is passing from the slicer to the wrapping machine. After the wrapping, it is also desirable to have the loaf held firmly together, upon its journey to the consumer. The device shown and described is sanitary, and it can be placed on the bread by machinery, it being unnecessary to handle the loaf. The device shown also aids the consumer by keeping the loaf of bread tightly bound together.

Having thus described the invention, what is claimed is:

1. A binder for bread and other articles, comprising a flexible band, buttons on the ends of the band, and a flexible securing element detachably assembled with both buttons, whereby the band may form part of a compact roll.

2. A binder for bread and other articles, comprising a flexible band, buttons on the band and having necks passing through the band, the necks being provided with prongs engaging the band to hold the buttons in place, and a flexible securing element detachably engaged with the necks, beneath the buttons.

3. A binder for bread and other articles, comprising a flexible tape, which is severable, the tape being provided with pairs of buttons, the buttons of each pair being located more closely together than are the adjacent buttons of the respective adjoining pairs.

CHARLES E. BOWMAN.